Oct. 17, 1944.  A. C. GOETHEL  2,360,669
WASHER OR CLEANER
Filed Aug. 28, 1942
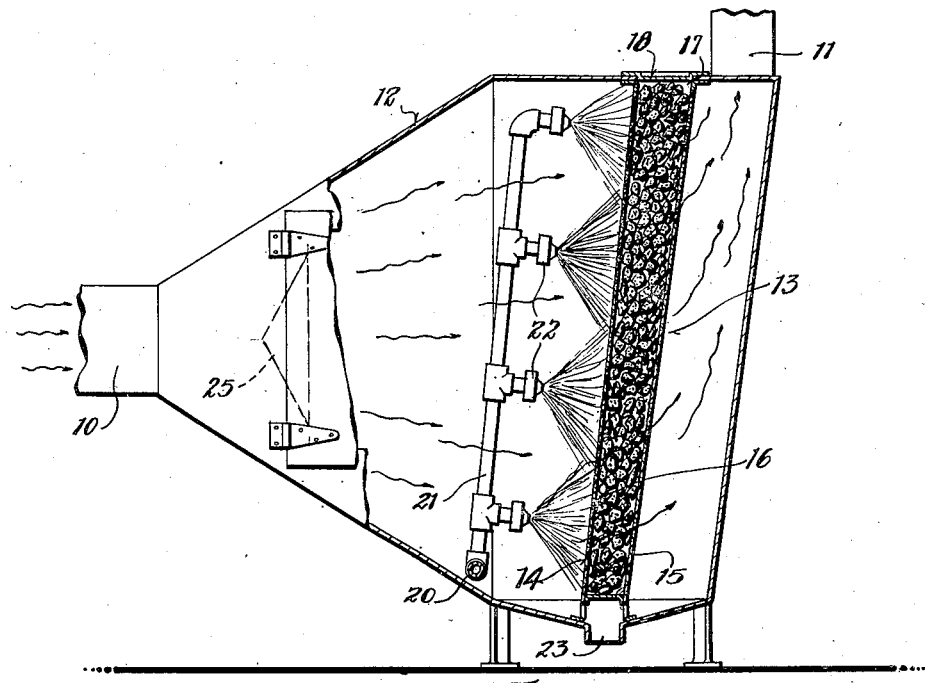
Fig. 1.
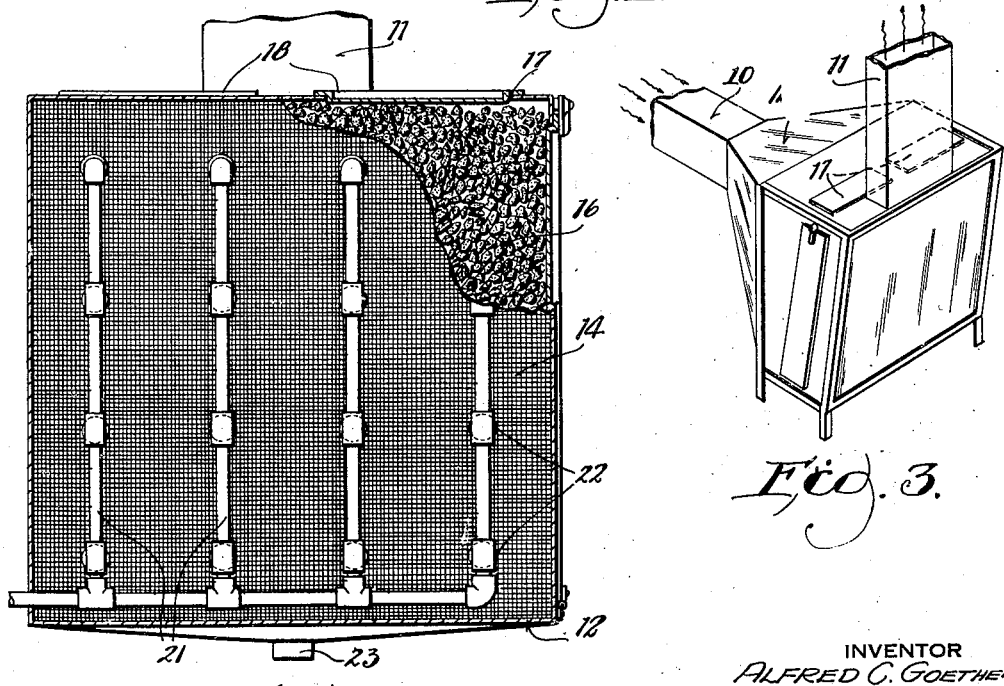
Fig. 2.
Fig. 3.
INVENTOR
ALFRED C. GOETHEL
BY
Wheeler, Wheeler & Wheeler
ATTORNEYS.

Patented Oct. 17, 1944

2,360,669

UNITED STATES PATENT OFFICE 2,360,669

WASHER OR CLEANER

Alfred C. Goethel, Milwaukee, Wis.

Application August 28, 1942, Serial No. 456,473

3 Claims. (Cl. 261—98)

My invention relates to improvements in washers or cleaners.

The object of my invention is to provide an air washer particularly suited to the washing or cleansing of air bearing comparatively large quantities of foreign material.

Another object of my invention is to provide a filter for an air washer with special means to so dispose the filter for constant cleansing that no special attendant is required to move or rearrange filter material over long continued periods of use.

Another object of my invention is to provide a filter having provision for sluicing action to clear the filter, and, at the same time, to provide throughout the entire area of a filter bed an even characteristic of permeability.

Other objects of my invention will be apparent from the following description.

In the drawing:

Figure 1 is a side elevation of my washer and housing thereof, portions of the housing being broken away in vertical section to disclose interior parts.

Figure 2 shows the sprays and filter portions of my washer viewed from within the housing.

Figure 3 is a perspective of my air washer showing inlet and outlet ducts.

Like parts are designated by the same reference characters throughout the several views.

I am aware that provision has heretofore been made for the use of lump coke in a "screen" for certain filtering purposes, but it will be noted from the following description that in my invention I have so disposed a coke-filled filter as to obtain a new result and to provide for the washing, cleaning, or filtering of large quantities of air in which substantial amounts of foreign matter are to be removed, as in industrial air washing or cleaning.

My washer or cleaner may be embodied or constructed in any housing for the passage of the gaseous material to be cleaned. For illustrative purposes, the drawing shows a conduit 10 and a delivery conduit 11 for the air or other gaseous medium. A suitable enlargement or housing 12 for the conduit 10 is made to provide for a filter 13 of suitable capacity, as will be understood from the following description. Gaseous medium such as air may be passed through the conduit 10 to the conduit 11 either by means of a forced feed through the conduit 10 or by means of a reduced pressure in conduit 11.

The housing at 12 may be of any suitable shape to receive across it two screen panels 14 and 15 of relatively coarse mesh, wire screening, or of fabric as desired, it being understood that these panels are not intended to perform any function other than that of holding the filter bed of coke chunks. Between the screens, I fill the space with coke chunks 16 of various sizes but preferably those averaging a nut size as that term is used in the fuel industry. These coke chunks are not packed in but are just poured into the space between the screens through suitable filler openings at 17. These filler openings are provided with covers 18.

It is of considerable importance to my invention that the filter bed of coke particles 16 between the screens 14 and 15 be disposed at an angle sufficiently deviating from the vertical so that a spray of water or other washing liquid projected with only a slight sluicing action upon the incoming side of the filter bed will, with the assistance of the movement of the filtering gaseous medium, pass relatively slowly through the filter bed to the outlet side of the bed and trickle down or from the screen panel 15. The spray device which I provide for the cleaning of the bed of coke 16 includes a header 20 and risers 21 which are in turn provided at spaced intervals with spray nozzles 22 positioned sufficiently closely together so that the composite spray from all of the spray nozzles will project against the entire area of screen 14 and into the bed of coke. The quantity of water or other sluicing liquid necessary for the cleaning of the bed will, of course, be determined by empirical methods as dictated by the amount of foreign matter borne by the gaseous medium to be filtered and by the nature of the foreign material to be deposited upon the coke particles in the bed 16. I have found with a coke bed 7 inches thick at the top and 6 feet by 8 feet in rectangular dimensions, approximately 300 gallons per hour of water sprayed upon the bed will keep it clean indefinitely where the gaseous medium passing through the bed is air and the foreign matter constitutes dust from a coal screening mill. Of course settling tanks and recirculating pumps can provide for repeated reuse of the water.

At 25 I provide a flat conically shaped baffle to spread the incoming dirt-laden air and prevent concentration of flow. Any form of baffle to accomplish this diffusion is of course acceptable.

While the coke bed is 7 inches thick at the top, I thin it gradually toward the bottom so that it is about 5 inches thick. My reason for doing this is that I have found that the concentration of trickling water toward the bottom of the coke bed resists air travel with the result that the upper part of the bed tends to carry a high percentage of the air to be treated. By thinning the bed at the bottom, I equalize the resistance of the thinner portion with the thicker portion at the top and thus gain equal air transmission over each square foot of the bed.

The action of my filter or air washer is particularly noteworthy because of the long continued spray which is possible without special attention. I have found that the coke bed does not slack down materially after the first few hours of use, and the coke particles preserve their excellent filtering characteristics because they are constantly sluiced by the spray from nozzles 22. Because the filter bed is nearly vertically disposed, the sluicing water does not tend to be carried by the gaseous medium as a spray from the trailing side of the bed at the screen 15, but instead forms a trickling cascade of water passing down along the screen to a drain 23 at the bottom of the housing. I have found that the optimum angle from the vertical for the disposition of the trailing side of my coke bed is 5 degrees from the vertical.

At this angle the water tends to adhere to the coke particles and to descend while maintaining such adherence, moving from particle to particle without being projected into the atmosphere in the form of spray.

I claim:

1. A cleanser for elastic fluids comprising the combination of a filtering chamber having front and rear end portions respectively provided with inlet and outlet connections for the fluid to be cleaned, an intermediate partitioning filter having downwardly convergent front and rear walls in the path of the fluid passing through said chamber, and means for spraying a cleansing liquid with substantial uniformity over the front surface of said filter, the downward convergence of the filtering walls being compensatory for the increased resistance of the filtering material due to progressive gravital accumulations of the cleansing liquid in its lower portions, whereby filtering uniformity may be approximated throughout the area of the partition by equalization of its resistance to the flow of elastic fluid therethrough, said partitioning filter also having a slight downward inclination from a vertical plane toward the portion of the chamber occupied by said spraying means, whereby the sprayed liquid tends to pass by gravity through the filter with uniform sluicing effects throughout its area.

2. A cleanser for elastic fluids comprising the combination of a filtering chamber having front and rear end portions respectively provided with inlet and outlet connections for the fluid to be cleansed, an intermediate partitioning filter having downwardly convergent front and rear foraminous walls and intervening coke fragments in the path of fluid passing through said chamber, and means for spraying a cleansing liquid with substantial uniformity over the entire area of the front wall of said filter, the downward convergence of the filtering walls being compensatory for the increased resistance of the filtering material due to progressive gravital accumulations of the cleansing liquid in its lower portions, whereby filtering uniformity may be approximated throughout the area of the partition by equalization of its resistance to the flow of elastic fluid therethrough, said partitioning filter also having a slight downward inclination from a vertical plane toward the portion of the chamber occupied by said spraying means, whereby the sprayed liquid tends to pass by gravity through the filter with uniform sluicing effects throughout its area.

3. In a filtering chamber for elastic fluids, the combination of a filtering partition having its central plane extending from top to bottom of the chamber at a slight inclination from a vertical plane, said partition being composed of downwardly convergent foraminous walls and a loose filling of filtering material between said walls, columns of spray nozzles connected with a source of liquid supply and positioned for substantially uniform distribution of a cleansing liquid sprayed over the surface of the partition from said nozzles, and baffle means for distributing air under pressure over the sprayed surface of the partition, said baffle means and spray nozzles being located on the side of the partition toward which it is downwardly inclined.

ALFRED C. GOETHEL.